(12) United States Patent
Heatherly et al.

(10) Patent No.: US 9,274,641 B2
(45) Date of Patent: Mar. 1, 2016

(54) GAME PIECES FOR USE WITH TOUCH SCREEN DEVICES AND RELATED METHODS

(75) Inventors: Christopher W. Heatherly, Monrovia, CA (US); Armen Mkrtchyan, Glendale, CA (US); Jonathan Backer, Burbank, CA (US); Brian White, Simi Valley, CA (US)

(73) Assignee: Disney Enterprises, Inc., Burbank, CA (US)

( * ) Notice: Subject to any disclaimer, the term of this patent is extended or adjusted under 35 U.S.C. 154(b) by 275 days.

(21) Appl. No.: 13/229,593

(22) Filed: Sep. 9, 2011

(65) Prior Publication Data

US 2012/0062490 A1     Mar. 15, 2012

Related U.S. Application Data

(63) Continuation-in-part of application No. 12/806,986, filed on Aug. 24, 2010.

(60) Provisional application No. 61/399,249, filed on Jul. 8, 2010.

(51) Int. Cl.
*A63F 9/24* (2006.01)
*G06F 3/041* (2006.01)
(Continued)

(52) U.S. Cl.
CPC .............. *G06F 3/0416* (2013.01); *A63F 13/02* (2013.01); *A63F 13/06* (2013.01); *A63F 13/08* (2013.01);
(Continued)

(58) Field of Classification Search
CPC ....... G06F 3/033; G06F 3/041; G06F 3/0488; G06F 2203/04106; G06F 13/385; G06F 9/4411; G06K 9/00; G06K 9/00577; H04L 43/0817; H04L 12/2602; H04L 43/00
USPC .................................................. 273/236–243
See application file for complete search history.

(56) References Cited

U.S. PATENT DOCUMENTS 6,439,956 B1* 8/2002 Ho ................................ 446/454
2005/0245302 A1* 11/2005 Bathiche et al. ................... 463/1

(Continued)

FOREIGN PATENT DOCUMENTS

| CN | 101052446 | 10/2007 |
|---|---|---|
| CN | 100549926 | 10/2009 |
| WO | WO 2006/033037 | 3/2006 |

OTHER PUBLICATIONS

Chinese Office Action dated Jan. 13, 2015 for Chinese Patent Application No. 201210300862.7.

*Primary Examiner* — Lixi C Simpson
*Assistant Examiner* — Ngan T Pham Lu
(74) *Attorney, Agent, or Firm* — Farjami & Farjami LLP

(57) ABSTRACT

There is provided a system and method for communicating with a first peripheral device, of a plurality of peripheral devices, using a touch-sensitive system that has a processor and a touch surface. According to an exemplary embodiment, a method includes detecting, using the processor, a plurality of touches on the touch surface of the touch-sensitive system that are made by the first peripheral device. The method further includes identifying, using the processor, the first peripheral device based on the plurality of touches on the touch surface of the touch-sensitive system that are made by the first peripheral device. The method additionally includes communicating data, using the processor, to a receptive circuit of the first peripheral device in response to the identifying of the first peripheral device.

18 Claims, 6 Drawing Sheets

(51) Int. Cl.
*A63F 13/98* (2014.01)
*G06F 3/0488* (2013.01)
*A63F 13/20* (2014.01)
*A63F 13/90* (2014.01)
*A63F 13/30* (2014.01)
*A63F 3/00* (2006.01)

(52) U.S. Cl.
CPC .............. *A63F 13/12* (2013.01); *G06F 3/0488* (2013.01); *A63F 3/00643* (2013.01); *A63F 3/00697* (2013.01); *A63F 2300/1043* (2013.01); *A63F 2300/1075* (2013.01); *A63F 2300/204* (2013.01); *G06F 2203/04808* (2013.01)

(56) References Cited

U.S. PATENT DOCUMENTS

| | | |
|---|---|---|
| 2006/0230192 A1* | 10/2006 | Parry et al. ............... 710/15 |
| 2008/0004110 A1 | 1/2008 | Cortenraad |
| 2008/0161086 A1 | 7/2008 | Decre |
| 2009/0322352 A1* | 12/2009 | Zachut et al. ............ 324/658 |
| 2012/0007808 A1 | 1/2012 | Heatherly |
| 2012/0007817 A1 | 1/2012 | Heatherly |
| 2012/0062490 A1 | 3/2012 | Heatherly |

\* cited by examiner

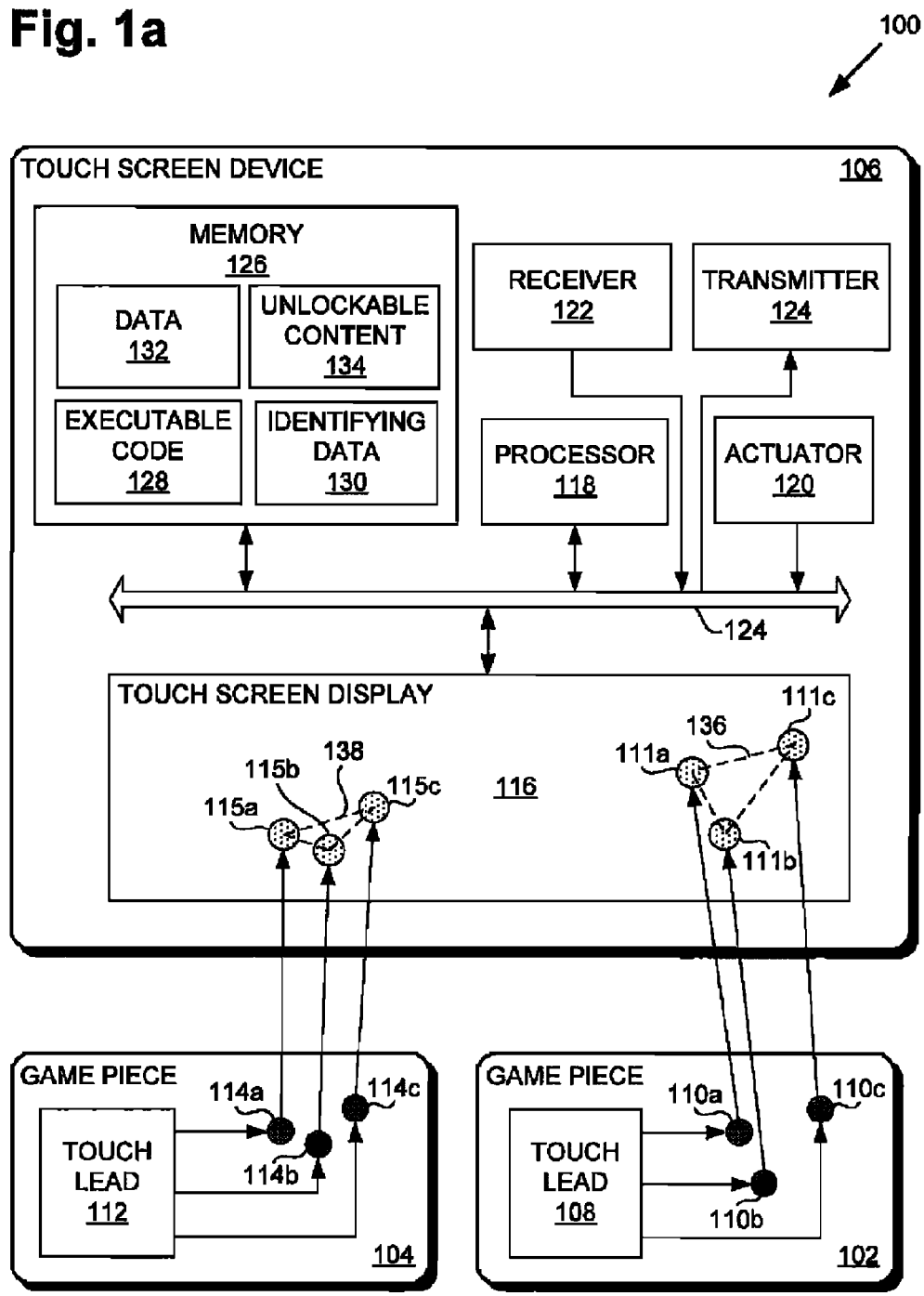

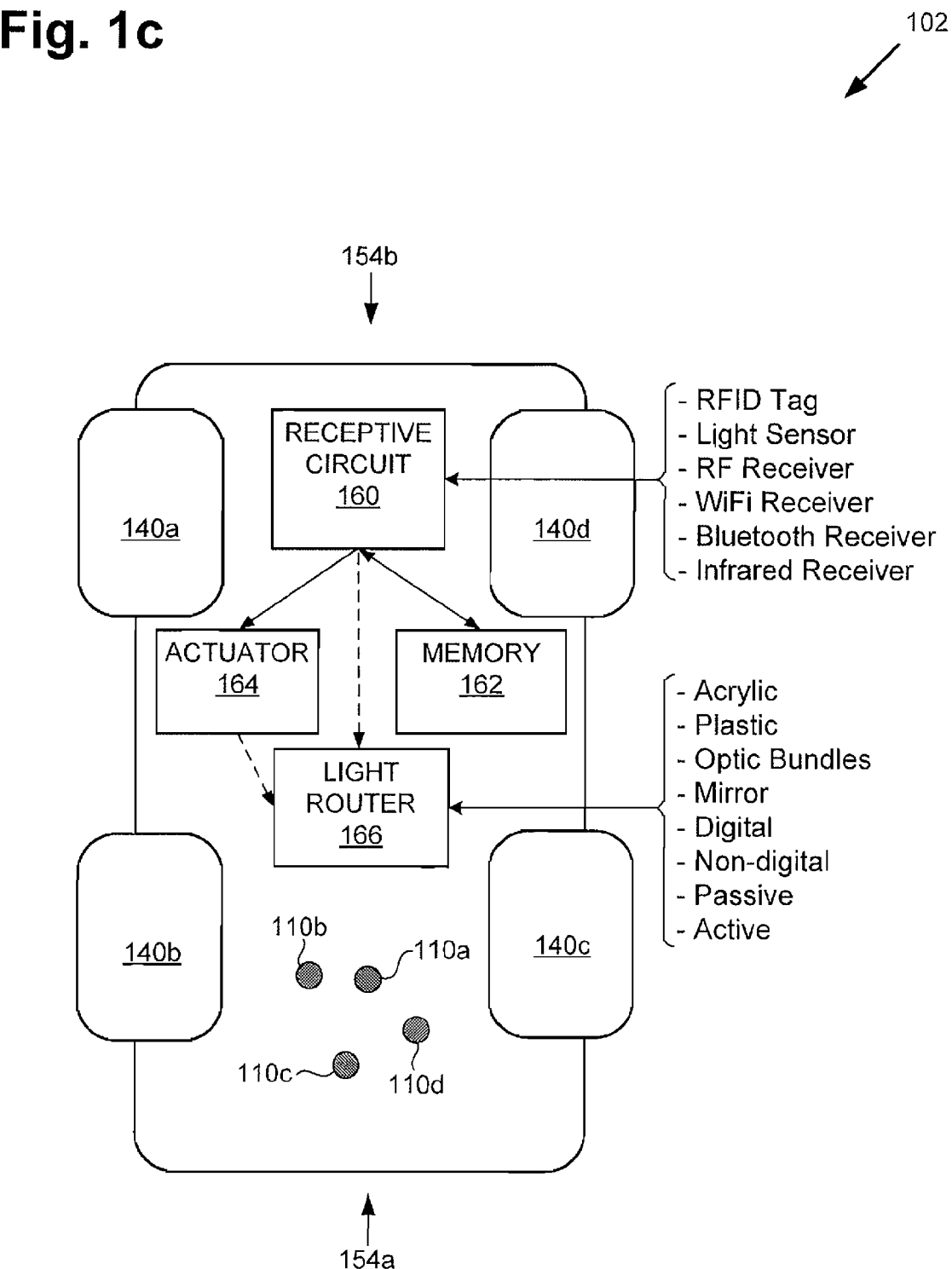

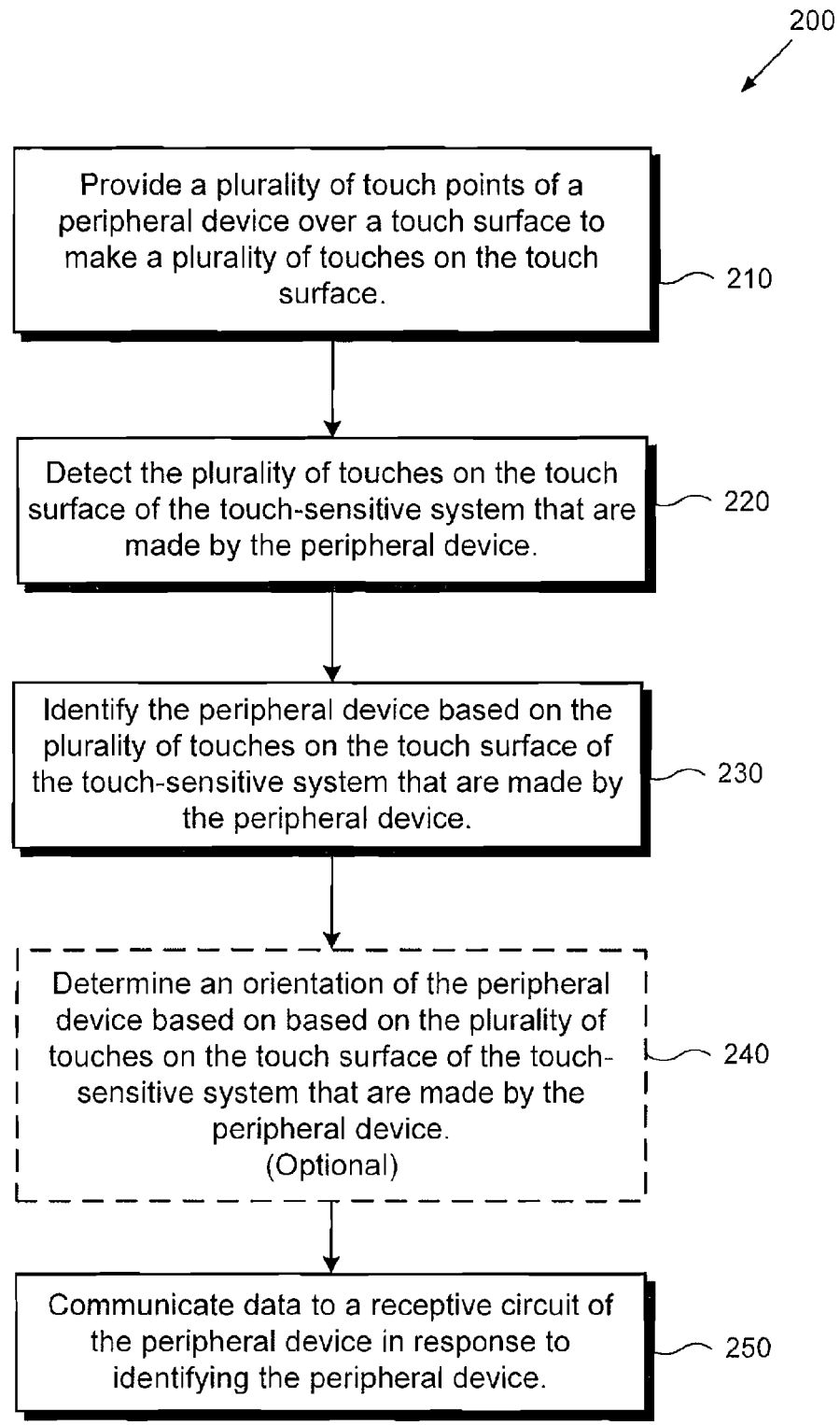

GAME PIECES FOR USE WITH TOUCH SCREEN DEVICES AND RELATED METHODS

RELATED APPLICATIONS

This application is a continuation-in-part of U.S. patent application Ser. No. 12/806,986, filed Aug. 24, 2010, which claims priority to U.S. Provisional Patent Application Ser. No. 61/399,249, filed Jul. 8, 2010, which are hereby incorporated by reference in the present application.

BACKGROUND OF THE INVENTION

1. Field of the Invention

The present invention relates generally to the field of electronic devices, and more particularly, to electronic devices using touch-sensitive surfaces.

2. Background Art

Touch-sensitive devices, such as touch screen devices, are becoming increasingly prevalent in the marketplace. These touch-sensitive devices offer a touch-sensitive surface that can detect the presence and position of touch-based input opening up the possibility of new ways to interact with electronic devices. The popularity of recent touch screen devices, including tablet computers such as iPad from Apple®, means that touch screen devices can be found among many family households. At the same time, physical game pieces and/or toys remain a staple of kids, with collectible figures and objects serving as a bedrock for imaginative toy play in the form of interaction between the figures and objects as well as the larger environment.

In this context, kids are having increased exposure to touch screen devices making it desirable to provide new technologies, which can enhance the interactive experience with touch screen devices and their existing toys.

In a conventional approach, a toy may be integrated with a video game or other software running on a computer through establishing wired or wireless communication between the toy and the computer. For example, the video game or other software could run on a touch screen device and communicate with the toy over a universal serial bus (USB) connection. However, this approach is limited in that the video game or other software cannot track the presence, position, and orientation of the toy in the physical world without requiring complex and expensive electrical components. These limitations present a barrier to new interactive experiences.

Accordingly, there is a need to overcome the drawbacks and deficiencies in the art while providing interactive game pieces and/or toys, which can be used with touch screen devices.

SUMMARY OF THE INVENTION

The present application is directed to game pieces for use with touch screen devices and related methods, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 1a presents a diagram of a touch-sensitive system including a first peripheral device and a second peripheral device, according to one embodiment of the present invention;

FIG. 1c shows a bottom view of a peripheral device according to one embodiment of the present invention; FIG. 2 shows a flowchart describing the steps, according to one embodiment of the present invention, for communicating with a peripheral device, of a plurality of peripheral devices, a using touch-sensitive system that has a processor and a touch surface.

DETAILED DESCRIPTION OF THE INVENTION

Figure 1B:
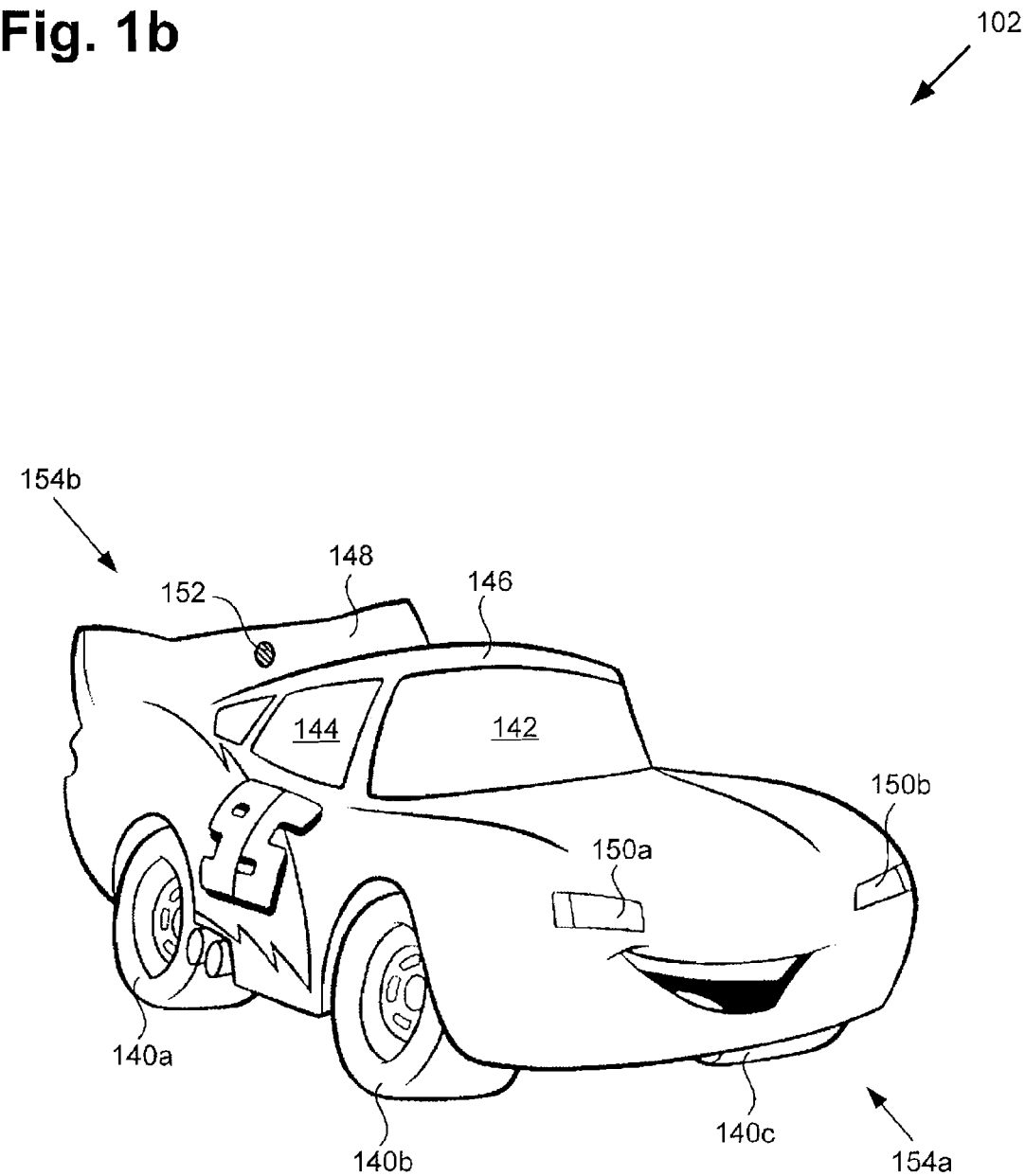
FIG. 1b shows a perspective view of a peripheral device, according to one embodiment of the present invention.

The present application is directed to game pieces for use with touch screen devices and related methods. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

FIG. 1a presents a diagram of touch-sensitive system 100 including a first peripheral device and a second peripheral device, according to one embodiment of the present invention. Touch-sensitive system 100 of FIG. 1a includes peripheral devices 102 and 104 and electronic device 106. Peripheral device 102 includes touch lead 108 and at least one touch point, such as touch points 110a, 110b, and 110c (also referred to "touch points 110"). Similarly, peripheral device 104 includes touch lead 112 and touch points 114a, 114b, and 114c (also referred to "touch points 114"). In the present embodiment, electronic device 106 includes touch surface 116, processor 118, actuator 120, receiver 122, transmitter 124, and memory 126. Memory 126 includes executable code 128, identifying data 130, data 132, and unlockable content 134.

According to various embodiments of the present invention, electronic device 106 can be, as a specific examples, a tablet computer, such as an Apple® iPad or Google® Android compatible tablet, a cellular phone, a personal computer, and generally a computer receiving input from a touch surface. It is noted that not all embodiments of the present invention require electronic device 106 to include each component shown and/or described herein, such as those in FIG. 1a. Rather, electronic device 106 is highly configurable and can have any combination of components shown and/or described in the present application, multiple instances those components, or other components not specifically described herein. Furthermore, certain components that are depicted as being internal to electronic device 106 may be external to electronic device 106 and/or shared with other electronic devices. In the present embodiment, touch surface 116, processor 118, actuator 120, receiver 122, transmitter 124, and memory 126 are coupled to one another and thus can communicate over bus 124. However, touch surface 116, processor 118, actuator 120, receiver 122, transmitter 124, and memory 126 can be coupled to one another using other means, for example, a plurality of dedicated lines, or a combination of buses and dedicated lines.

In touch-sensitive system 100, processor 118, which can comprise, for example, a central processing unit (CPU), is configured to operate in accordance with executable code 128 stored in memory 126. Memory 126 can comprise, for example, random access memory (RAM) and executable code 128 can include software, for example, a video game, educational software, or other software, such that processor 118 operates in accordance with instructions in the software. The software can implement various methods in accordance with embodiments of the present invention.

Also in touch-sensitive system 100, touch surface 116 is capable of registering the presence and position of multiple touch-based inputs thereon. For example, FIG. 1a shows touches 111a, 111b, and 111c (also referred to as "touches 111") on touch surface 116, which are made by peripheral device 102. FIG. 1a also shows touches 115a, 115b, and 115c (also referred to as "touches 115"), which are made by peripheral device 104. In the present embodiment, touches 111 are contemporaneous and form contemporaneous touches 136. Similarly, touches 115 are contemporaneous and form contemporaneous touches 138. In some embodiments, touch surface 116 is a capacitive touch surface, which measures a change in capacitance between pairs of electrodes caused by a disturbance in an electrostatic field to sense touch-based input. Also in some embodiments, touch surface 116 is a resistive touch surface. Touch surface 116 may also use pressure-based touch sensing, or other means, in embodiments of the present invention.

FIG. 1a shows touch surface 116 as being part of a touch screen display that is capable of displaying a digital image. Thus, the present application also refers to touch surface 116 as touch screen display 116. However, embodiments of the present invention do not require a touch screen display or any display. Also, in some embodiments, electronic device 106 includes a display that is separate from touch surface 116 in addition to or instead of including a touch screen display.

In touch-sensitive system 100, processor 118 is configured to detect one or a plurality of touches on touch surface 116 of touch-sensitive system 100 that are made by a peripheral device. In one embodiment, processor 118 is configured to detect touches 111, which all occur within a time interval. Similarly, in one embodiment, processor 118 is configured to detect touches 115, which all occur within a time interval. For example, in the present embodiment, processor 118 can detect contemporaneous touches 136 and can detect contemporaneous touches 138. The number of contemporaneous touches on touch surface 116, which may be detected by processor 118, is generally limited by the capabilities of touch surface 116.

Processor 118 is also configured to identify the peripheral device based on the one or plurality of touches on touch surface 116 of touch-sensitive system 100 that are made by the peripheral device. For example, processor 118 can identify peripheral device 102 based on contemporaneous touches 136 and can identify peripheral device 104 based on contemporaneous touches 138. In the present embodiment, identifying data 130 characterizes contemporaneous touches 136 with respect to other touch-based input or inputs, such as contemporaneous touches 138, such that processor 118 can identify peripheral device 102 by comparing contemporaneous touches 136 to identifying data 130. Identifying data 130 may be sufficient such that processor 118 can distinguish between contemporaneous touches 136 made by peripheral device 102 and contemporaneous touches 138 made by peripheral device 104. As one example, identifying data 130 can comprise distances between touch points 114 of peripheral device 102. By determining that those distances match distances between touches 111, processor 118 can identify peripheral device 102. In various embodiments, identifying data 130 can comprise angles between touches 111, an area formed between touches 111, a number of adjacent touches 111, and/or other information sufficient to characterize contemporaneous touches 136.

In one embodiment, identifying data 130 is a stored shape, such as a triangle, which processor 118 compares and/or matches with a shape formed by touches 111 or a shape of one of touches 111. For example, processor 118 can detect that contemporaneous touches 136 form a triangle as shown in FIG. 1a or that touch 111a is round. Processor 118 can then, for example, compare and/or match the triangle formed by contemporaneous touches 136 to identifying data 130 to identify peripheral device 102. It will be appreciated that processor 118 can similarly identify peripheral device 104. As is apparent from FIG. 1a, the triangle formed by contemporaneous touches 136 is distinguishable from a triangle formed by contemporaneous touches 138, allowing for peripheral devices 102 and 104 to have different identities.

In some embodiments, processor 118 can identify peripheral device 102 based on touches 111 on touch surface 116 of touch-sensitive system 100 even where touches 115 and or other touch-based input, such as finger input, are also present on touch surface 116, Furthermore, processor 118 can identify peripheral device 102 with high accuracy. For example, in some embodiments, varying touches 111 by less than a millimeter can result in a failed or different identification of peripheral device 102. Thus, in some embodiments, processor 118 can identify peripheral device 102 based on touches 111 on touch surface 116 of touch-sensitive system 100 with sufficient accuracy that peripheral device 102 can act as a key. For example, peripheral device 102 can be a keycard placed on touch surface 116 to open a door.

In one embodiment, peripheral device 102 can be used to access unlockable content 134 by identifying peripheral device 102. The identification may render unlockable content 134 permanently accessible, or future identification may be required to obtain additional access unlockable content 134. In one example, peripheral device 102 is a print out in a magazine that has conductive touch points 110 thereon. Identifying peripheral device 102 can provide access to unlockable content 134, which may be a digital coupon. As another example, peripheral device 102 can be a Mater toy from the animated film Cars by Disney/Pixar. Processor 118 can identify the Mater toy, as described above, thereby allowing access to unlockable content 134, which may be a junkyard themed level in a video game. Additionally, or alternatively, unlockable content 134 can be a voice that is associated with the identity of peripheral device 102, such that actuator 120 and/or 164 (e.g. speakers) can play the voice of Mater.

In yet another example, unlockable content 134 comprises a digital depiction of Mater that is displayed on touch surface 116 in a parking lot scene after being identified by Processor 118. The parking lot scene can further include other toys (e.g., peripheral device 104) that have previously been identified by processor 118, thereby tracking and displaying each toy that may be owned by a user of electronic device 106. Furthermore, the parking lot can track and indicate toys that have not been identified by processor 118. Thus, in one embodiment, unlockable content 134 can be selected depending on an identity of peripheral device 102 as compared to other peripheral devices, such as peripheral device 104. Other examples of unlockable content 134 include user preferences and information about previous uses of software, such as a video game, and in software events, such as allowing other characters to interact with or acknowledge peripheral device 102.

Unlockable content 134 can require further identification via, for example, a user name, password and/or a fingerprint. For example, a user may be authenticated using electronic device 106 or server-side using a username and password. In one embodiment, unlockable content 134 is selected based on a geographical location of electronic device 106 in which processor 118 identifies peripheral device 102. For example, if electronic device 106 was geographically located near Disneyland, the digital depiction of Mater that is displayed on touch surface 116 may have a Mickey Mouse decal or the junkyard level may instead be a Disney themed level or be modified to include Disney themed attributes.

In some embodiments, processor 118 can differentiate between peripheral devices that have similar identities as identified by processor 118 based on one or a plurality of touches, such as touches 111. For example, in one embodiment, an RFID tag or other electronic circuit stores data that can be used to distinguish between peripheral devices, even where the peripheral devices include identical or similar touch points. In another embodiment, one or more additional touch points can be included in the peripheral devices, where processor 118 can differentiate between the peripheral devices based on a presence and/or respective locations of the one or more additional touch points. For example, the touch point can be a conductive dot where peripheral device 102 has locations where a user could place the conductive dot, each location corresponding to a distinguishable configuration for the peripheral device. In another embodiment, a switch of peripheral device 102 can select between different presets, where each preset corresponds to a distinguishable configuration for the peripheral device. The switch may mechanically and/or electrically activate one or more additional touch points depending on a selected preset. Exemplary switches include at least one of a button on peripheral device 102, a dynamic circuit-based switch, a gravity-based switch utilizing an angle and/or position of peripheral device 102, an articulation switch based on a positioning or pose of peripheral device 102 (e.g., positioned joints of peripheral device 102), a magnetic switch that detects, for example, a proximity of an accessory to peripheral device 102 based on an electric field, and a push switch and/or contact point, for example, to detect a presence of an accessories that attach to peripheral device 102, such as a weapon. In some embodiments, the peripheral devices can be distinguished by being linked to a user password, a fingerprint, or other identifying data.

In the present embodiment, processor 118 is further configured to determine an orientation of the peripheral device based on the one or plurality of touches on touch surface 116 of touch-sensitive system 100 that are made by the peripheral device. For example, processor 118 can determine an orientation of peripheral device 102 based on touch 111a or plurality of contemporaneous touches 136. As the shape shown in FIG. 1a (e.g. triangle), for example, that is formed by contemporaneous touches 136 is not symmetric on two axes, processor 118 can determine an orientation of peripheral device 102. As one example, touch 111c can be designated as adjacent a front of peripheral device 102 and touches 111a and 111b can be designated as respective left and right sides of peripheral device 102. Thus, processor 118 can be configured to determine an orientation of the peripheral device 102 based on the identity of peripheral device 102. Processor 118 can determine an orientation of peripheral device 102 with respect to touch surface 116 and/or other peripheral devices, such as peripheral device 104. It will be appreciated that processor 118 can similarly determine an orientation of peripheral device 104.

In some embodiments, processor 118 is also configured to communicate data 132 to a receptive circuit of peripheral device 102. Data 132 can be communicated to the receptive circuit in response to processor 118 identifying peripheral device 102 based on touches 111 on touch surface 116 of touch-sensitive system 100 that are made by peripheral device 102. By identifying peripheral device 102 based on touches 111 on touch surface 116, electronic device 106 can track the presence, position and/or orientation of peripheral device 102 in the physical world, without requiring complex and expensive electrical components. Furthermore, communicating data 132 to a receptive circuit of peripheral device 102 in response to processor 118 identifying peripheral device 102 based on touches 111 on touch surface 116, introduces opportunities for new interactive experiences.

Figure 1D:
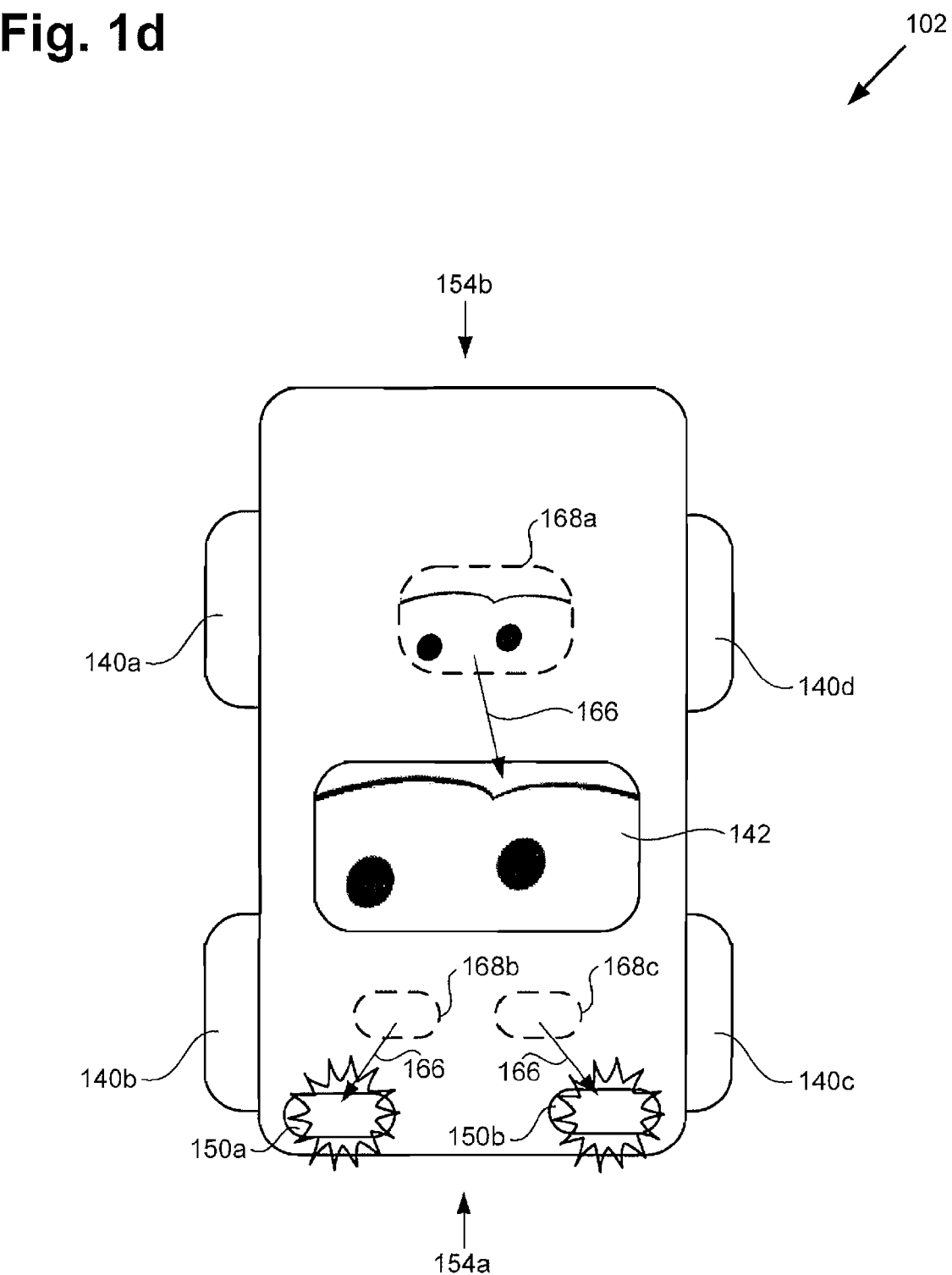
FIG. 1d shows a top view of a peripheral device according to one embodiment of the present invention.

Peripheral devices 102 and 104 can be, for example, interactive game pieces and/or toys, such as action figures, vehicles, and/or accessories. However, the particular form and components included in peripheral devices 102 and 104 are customizable depending on application specific requirements. Furthermore, peripheral devices 102 and 104 need not be toys or game pieces and may be designed for adult or general use, which may not be related to personal entertainment. FIGS. 1b, 1c, and 1d show selected views of peripheral device 102, in accordance with one embodiment of the present invention. For example, FIG. 1b shows a perspective view of peripheral device 102, which is a vehicle that is depicted as the character Lightning McQueen from the animated film Cars by Disney/Pixar. FIG. 1c shows a bottom view of peripheral device 102 and FIG. 1c shows a top view of peripheral device 102.

Peripheral device 102 comprises wheels 140a, 140b, 140c, and 140d (also referred to as wheels 140), windshield 142, right window 144, roof 146, spoiler 148, headlights 150a and 150b (also referred to as headlights 150), button 152, front 154a, and back 154b. As shown in FIG. 1c, peripheral device 102 also comprises receptive circuit 160, memory 162, actuator 164, and light router 166. As peripheral device 102 comprises receptive circuit 160, it may be considered an active peripheral device or active game piece. However, it will be appreciated that receptive circuit 160 and other components are not required in many embodiments. Peripheral device 102 also includes touch point 110d, which is not shown in FIG. 1.

In the present embodiment, touch points 110a, 110b, and 110c are configured to contact touch surface 116 of touch-sensitive system 100. Touch points 110a, 110b, and 110c are further configured to provide touches 111 to touch-sensitive system 100 for identifying peripheral device 102. FIG. 1a shows that contemporaneous touches 136 are provided on touch surface 116 by peripheral device 102 and that contemporaneous touch 138 are provided on touch surface 116 by peripheral device 104. In the embodiment shown in FIG. 1a, touch points 110 and 114 each comprise conductive material. Furthermore, touch points 110 and 114 are electrically coupled to touch leads 108 and 112 respectively. Touch lead 108 distributes a touch-based input to touch points 110 such that touch surface 116 receives touch points 110 contemporaneously as contemporaneous touches 136. Similarly, touch lead 112 distributes a touch-based input to touch points 114 such that touch surface 116 receives touch points 114 contemporaneously as contemporaneous touches 138. The touch-based input can, for example, originate from a human touch, such as a finger touch on peripheral device 102 and/or 104 or can be generated by a circuit that is internal or external to peripheral device 102 and/or 104.

In one embodiment, peripheral device 102 can dynamically reroute touch lead 108 and/or other touch leads therein, thereby activating or deactivating any of touch points 110 to control a presence of touches 111 on touch surface 116. For example, touch lead 108 or another touch lead can be connected to touch point 110d to selectively provide an additional touch on touch surface 116. Touches 111 can generally be enabled and disabled in any manner, such as Morse code like flashes, to thereby communicate to processor 118. For example, peripheral device 102 can comprise a battery and can communicate a status of the battery to processor 118 using touches points 110. Thus, in one embodiment, peripheral device 102 is configured to communicate data to processor 118 through touch surface 116 by manipulating touch points 111.

Peripheral device 102 also comprises receptive circuit 160 that is configured to receive data 132 that is communicated to peripheral device 102 in response to the identifying of peripheral device 102. FIG. 1c lists possible components, which can be included in receptive circuit 160, in accordance with various embodiments of the present invention. In one embodiment, peripheral device 102 is configured to receive data 132 from a radio frequency (RF) transmission. Receptive circuit 160 can comprise, for example, a WiFi receiver, a Bluetooth receiver, an Infrared Receiver, or other radio RF receiver, which can receive data 132 or other information from transmitter 124 of electronic device 106. In some embodiments, the RF receiver can be part of a transceiver, whereby peripheral device 102 can also communicate data to receiver 122 of electronic device 106. In some embodiments, receptive circuit 160 can be a passive circuit, such as a Radio Frequency Identification (RFID) tag or a similarly passive tag. Thus, as described above, communicating data 132 to receptive circuit 160 of peripheral device 102 can be performed utilizing an RF transmission.

In one embodiment, receptive circuit 160 comprises one or more light sensors (e.g., photoreceptors) that are configured to receive light that is generated by a display of touch-sensitive system 100. Processor 118 communicating data 132 to receptive circuit 160 of peripheral device 102 can be performed utilizing the light generated using the display or light emitter of touch-sensitive system 100. In one embodiment, peripheral device 102 can be placed over touch screen display 116. For example, wheels 140 can be set on touch screen display 116. Thereafter, light can be generated on touch screen display 116, which communicates data 132 to receptive circuit 160. In one embodiment, processor 118 can communicate data 132 to receptive circuit 160 utilizing a static digital image, such as a bar code. In one embodiment, data 132 is communicated to receptive circuit 160 utilizing a non-static digital image (e.g. digital video), which may be displayed on touch surface 116.

In yet another embodiment, processor 118 can communicate data 132 to receptive circuit 160 utilizing a flashing light pattern. For example, an ON/OFF light pattern can be utilized where one or more frequencies of light are interpreted as a logical ON and one or more frequencies of light are interpreted as a logical OFF, which is interpreted by receptive circuit 160 as a digital signal. As another example, Morse code like flashes of light can be used. Thus, communicating data 132 to receptive circuit 160 may have a bandwidth that is limited by a refresh rate of touch screen display 116. It will be appreciated that more complex light patterns are possible.

In a further embodiment, processor 118 can communicate data 132 to receptive circuit 160 utilizing color, whereby one or more colors is deciphered by receptive circuit 160. For example the color red can have a different meaning than the color blue as perceived by receptive circuit 160. It is noted that in some embodiments, processor 118 can communicate data 132 or other data to receptive circuit 160 of peripheral device 102 utilizing any combination of the means described above, without first identifying peripheral device 102.

In one embodiment, processor 118 can generate light using a display of touch-sensitive system 100, such as touch screen display 116, such that the light is generated at a position and/or orientation on the display that is based on a position and/or orientation of peripheral device 102. The light may not necessarily be utilized by processor 118 to communicate data 132 to receptive circuit 160. In one embodiment, peripheral device 102 is over touch screen display 116. Processor 118 can determine a position and/or orientation of peripheral device 102 and can generate the light under or completely under peripheral device 102 based on the position and/or orientation of peripheral device 102. For example, processor 118 can generate the light under one or more light sensors of receptive circuit 160 of peripheral device 102. Thus, in some embodiments, the light that is generated by processor 118 can track with (i.e. move with) peripheral device 102 across touch screen display 116, thereby allowing for processor 118 to communicate data 132 to receptive circuit 160, even where peripheral device 102 moves across and/or rotates over touch screen display 116. Furthermore, this process can be hidden from a user as it can be physically concealed by peripheral device 102.

In some embodiments, the light that is generated by processor 118 on touch screen display 116 is utilized to virtually augment physical characteristics of peripheral device 102. In the present embodiment, windshield 142 and headlights 150 are emission locations for light. FIG. 1b shows windshield 142 and headlights 150 as not being illuminated by light. In contrast, FIG. 1d shows windshield 142 and headlights 150 as being illuminated by light. In some embodiments, the light that illuminates windshield 142 and/or headlights 150 originates from light that is generated from electronic device 106, such as light from touch screen display 116. Thus, for example, the light can track with peripheral device 102 across touch screen display 116 such that windshield 142 and/or headlights 150 and other emission locations of peripheral device 102 can receive the light as peripheral device 102 moves across and/or rotates over touch screen display 116. Furthermore, this process can be hidden from a user as it can be concealed by peripheral device 102.

To illustrate the foregoing, FIG. 1d shows digital images 168a, 168b, and 168c (also referred to digital images 168), which comprise light generated by processor 118 on touch screen display 116. As shown is FIG. 1d, peripheral device 102 comprises at least light router 166, which provides digital images 168 to respective emission locations of peripheral device 102. For example, digital image 168a is provided to windshield 142, digital image 168b is provided to headlight 150a and digital image 168c is provided to headlight 150b. Thus, by changing any of digital images 168, processor 118 can change what is provided to respective emission locations of peripheral device 102. For example, headlights 150 of peripheral device 102 can blink and/or change color responsive to processor 118. Furthermore, windshield 142 can display eyes and eyebrows as shown in FIG. 1d that can be animated, thereby enhancing a users interactive experience and more accurately representing Lightning McQueen. As such, the light that is generated by processor 118 on touch screen display 116 can virtually augment physical characteristics of peripheral device 102.

FIG. 1c lists some exemplary implementations of light router 166. In some embodiments light router 166 is digital. For example, windshield 142 can be a display and receptive circuit 160 can be a camera. FIG. 1c shows light router 166 as optionally being electrically connected to receptive circuit 160, as indicated by a dashed line, which can be used to receive a signal to control the display. In other embodiments light router 166 is non-digital. For example, light router 166 can comprise one or more mirrors, which reflect digital image 168a to windshield 142. A lens may be employed to focus and project digital image 168a to windshield 142. In various embodiments, light router 166 can comprise, acrylic, plastic, or other materials suitable for routing light. In one embodiment, light router 166 comprises optical fibers, such as optical bundles, where the optical fibers transfer light from pixels on touch screen display 116 to, for example, route an image from touch screen display 116. In one embodiment, light router 166 comprises a prism with a mirror surface and a curved surface. Where light router 166 is passive, and non-digital, (e.g., using optical bundles, acrylic, and/or mirrors to project digital image 168a to windshield 142) cost and complexity of peripheral device 102 can be low while still providing robust virtual augmentation to physical characteristics of peripheral device 102. For example, it will be appreciated that in some passive embodiments, peripheral device 102 does not require any electrical components, such as receptive circuit 160, memory 162, and actuator 164.

FIG. 1c shows that memory 162 of peripheral device 102 is coupled to receptive circuit 160. Memory 162 of peripheral device 102 can store data, such as data 132 and thus, in one embodiment, is configured to store data 132. In some embodiments, memory 162 need not be coupled to receptive circuit 160. In one embodiment, data is pre-stored in memory 162. Data stored in memory 162 can comprise, for example, user preferences, information about previous uses of software, such as a video game, software status information, such as an amount of virtual currency obtained and scores achieved in a game play, and data indicating that unlockable content 134 is available for use in software. In one embodiment, the data in memory 162 is linked to a password that can be entered on electronic device 106, as an example. In one embodiment, the data in memory 162 is linked to a fingerprint, which can be captured from peripheral device 102 or from electronic device 106, as examples. Also, in one embodiment, the data in memory 162 can be linked to the identity of peripheral device 102. For example, data 132 may only be stored in memory 162 or data may be read from memory 162 in response to processor 118 identifying peripheral device 102 as Lighting McQueen, as opposed to other characters, such as Mater, using for example, using touches 111. As such, the identity of peripheral device 102, as determined by processor 118, can be utilized as an authentication means for access to memory 162.

FIG. 1c also shows at least one actuator 164 of peripheral device 102 is coupled to receptive circuit 160. FIG. 1c shows actuator 164 as optionally being electrically connected to light router 166, as indicated by a dashed line, which can be used to provide a signal to control an emission location of peripheral device 102, such as headlights 150. Thus, in one embodiment, actuator 164 is configured to be controlled by data 132. In some embodiments, actuator 164 can switch headlights 150 on and off. Actuator 164 can comprise, as examples, an electrical motor, a screw, a wheel and axle, or other actuator. In one embodiment, data 132 controls actuator 164, which is communicated to receptive circuit 160, as described above. Thus, for example, peripheral device 102 can physically move in response to data 132. In various embodiments, peripheral device 102 can move, blink, emit a noise, and/or vibrate in response to data 132.

Figure 1E:
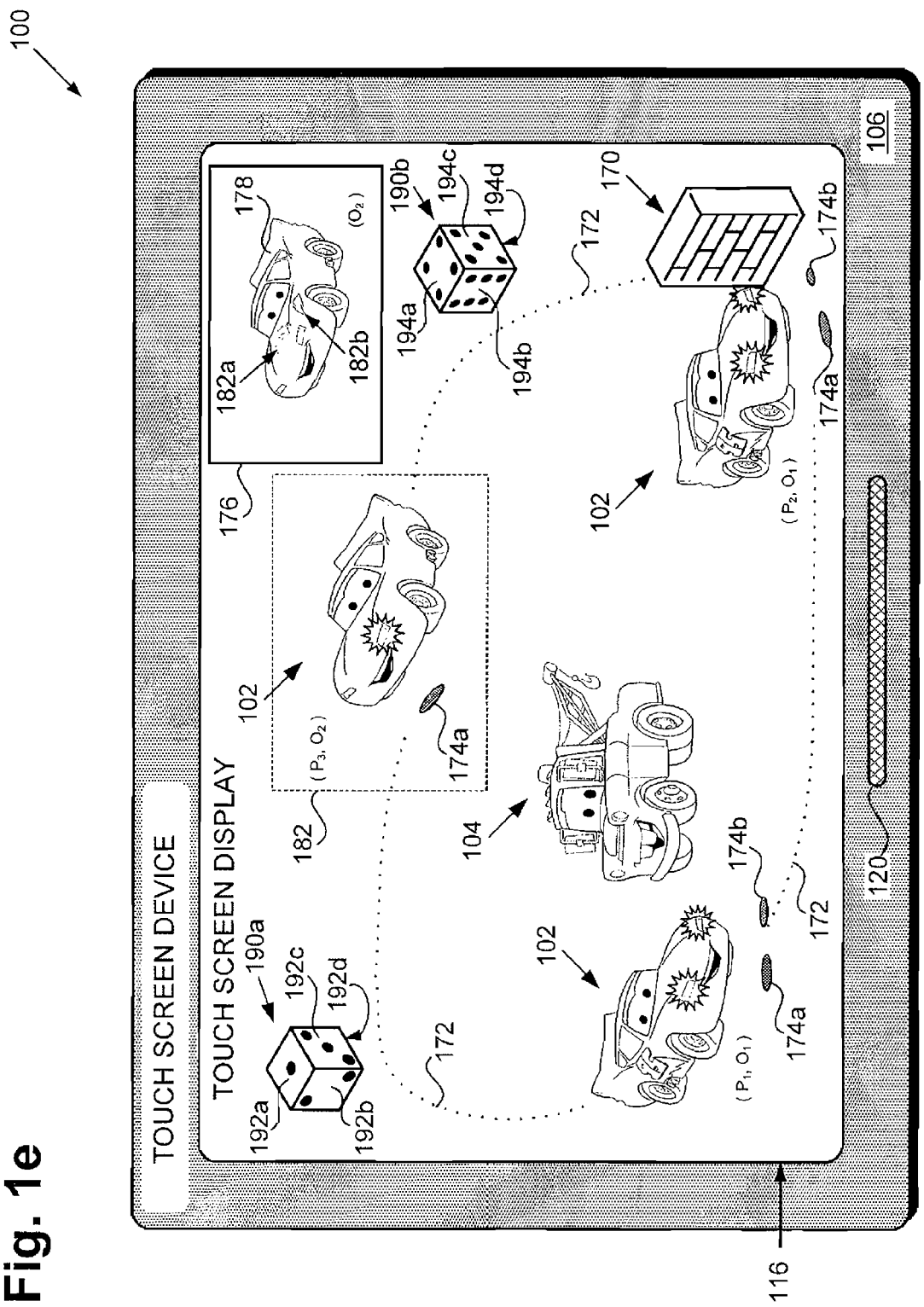
FIG. 1e shows an exemplary sequence that can be used to illustrate a method of communicating with a peripheral device using touch-sensitive system, according to one embodiment of the present invention.

FIG. 1e shows an exemplary sequence that can be used to illustrate a method of communicating with peripheral device 102 using touch-sensitive system 100, according to one embodiment of the present invention. Referring to FIG. 2, FIG. 2 shows a flowchart describing the steps, according to one embodiment of the present invention, for communicating with peripheral device 102, of a plurality of peripheral devices, using touch-sensitive system 100 that has processor 118 and touch surface 116. Certain details and features have been left out of flowchart 200 that are apparent to a person of ordinary skill in the art. For example, a step may comprise one or more substeps or may involve specialized equipment or materials, as known in the art. While steps 210 through 250 indicated in flowchart 200 are sufficient to describe one embodiment of the present invention, other embodiments of the invention may utilize steps different from those shown in flowchart 200. For example, as shown in FIG. 2, step 240 can be optional. Furthermore, certain steps, such as step 250, may have multiple instances that occur concurrently, and/or are repeated consecutive times.

Referring to step 210 of flowchart 200 in FIG. 2 and FIGS. 1a-1d, step 210 of flowchart 200 comprises providing touch points 110a, 110b, and 110c of peripheral device 102 over touch surface 116 of electronic device 106 to make touches 111 on touch surface 116. For example, a user can place peripheral device 102 on touch surface 116 such that touch points 110a, 110b, and 110c are over touch surface 116. In some embodiments, in order to provide touches 111 contemporaneously on touch surface 116, touch points 110 are elastic. For example, touches points 110 can comprise conductive elastomer and may be hollow inside. In some embodiments, touch points 110 are each mounted on individual springs and/or attached to elastic washers such so that each touch point 110 can pivot independently. Also, in one embodiment, touch points 110 are on a substrate, where the substrate is attached to a spring or elastic material. In this embodiment, touch points 110 can be fixed in a position relative to one another on the substrate, but the substrate can pivot. In these ways, contemporaneous touches 136 can be provided on touch surface 116 even when peripheral device 102 is tilted.

As one specific example, peripheral devices 102 and 104 can represent digital characters in a video game running on electronic device 106. Furthermore, electronic device 106 may have any of the identity, presence, position, and orientation of peripheral devices 102 and 104 stored in memory 126 prior to step 210, which may have been determined by processor 118 using steps similar to those shown in flowchart 200. Alternatively, any of the identity, presence, position, and orientation of peripheral devices 102 and 104 can be determined by processor 118 after step 210.

Referring to step 220 of flowchart 200 in FIG. 2 and FIGS. 1a-1d, step 220 of flowchart 200 comprises processor 118 detecting touches 111 on touch surface 116 that are made by peripheral device 102. For example, a user can touch at least one of right window 144, roof 146, and spoiler 148, which can be contact regions that are coupled to one or more touch leads, such as touch lead 108, to transfer a touch to touch points 110. In addition to, or in the alternative to having contact regions, button 152 can be included, which is a touch switch that can selectively enable the generation of touches 111 by a circuit within peripheral device 102.

Referring to step 230 of flowchart 200 in FIG. 2 and FIGS. 1a-1d, step 230 of flowchart 200 comprises processor 118 identifying peripheral device 102 based on touches 111 on touch surface 116 of touch-sensitive system 100 that are made by peripheral device 102. For example, processor 118 can compare a triangle formed by contemporaneous touches 136 to identifying data 130 to identify peripheral device 102. As a specific example, processor 118 can identify peripheral device 102 as Lightning McQueen, peripheral device 104 as Mater from Disney/Pixar's Cars.

Referring to step 240 of flowchart 200 in FIG. 2 and FIGS. 1a-1d, step 240 of flowchart 200 comprises processor 118 optionally determining an orientation of peripheral device 102 based on based on touches 111 on touch surface 116 of touch-sensitive system 100 that are made by peripheral device 102. For example, processor 118 can determine an orientation of peripheral device 102 with respect to peripheral device 104 and/or touch surface 116. This can be accomplished, for example, by determining a rotational offset of the triangle formed by contemporaneous touches 136 with respect to a triangle stored in identifying data 130. It will be appreciated that other means are possible. Furthermore, processor 118 can associate a point or region of the triangle formed by contemporaneous touches 136 with front 154a of peripheral device 102 and another point or region of the triangle formed by contemporaneous touches 136 with back 154b.

Referring to step 250 of flowchart 200 in FIG. 2 and FIGS. 1a-1d, step 250 of flowchart 200 comprises processor 118 communicating data 132 to receptive circuit 160 of peripheral device 102 in response to identifying peripheral device 102. For example, processor 118 can communicate data 132 utilizing transmitter 124, which can be, for example, an RF transmitter, or other means for communicating data 132 to receptive circuit 160 of peripheral device 102, as described above.

An exemplary sequence will be described below with respect to FIGS. 2 and 1e to better illuminate various inventive concepts. In step 210, a user can place peripheral device 102 at position $P_1$ and orientation $O_1$ over touch surface 116 and can press button 152 that can selectively enable the generation of touches 111 by a circuit within peripheral device 102, which are detected by processor 118 using step 220. Using step 230, processor 118 can identify peripheral device 102 as Lightning McQueen from Disney/Pixar's Cars. Furthermore, processor 118 may already have performed steps 210 through 240 with respect to peripheral device 104 and identified peripheral device 104 as Mater from Disney/Pixar's Cars.

Using step 250, processor 118 may control headlights 150 and windshield 142 so they are illuminated as has been described above. Furthermore, processor 118 can generate digital headlights 174a and 174b (also referred to as digital headlights 174), which are digital images on touch screen display 116 that represent reflections of headlights 150. The position and orientation of digital headlights 174 can be generated based on position $P_1$ and orientation $O_1$ of peripheral device 102. Thus, digital headlights 174 can track with peripheral device 102 across touch surface 116. Furthermore, digital headlights 174 can blink, flicker, and/or change color based on position $P_1$ and orientation $O_1$ of peripheral device 102.

After step 240, processor 118 may determine that peripheral device 102 is facing peripheral device 104 and in step 250, because Lightning McQueen is facing Mater based on position $P_1$ and orientation $O_1$, and actuator 120 may comprise a speaker used to simulate a conversation between Lightning McQueen and Mater. Also, in one embodiment, actuator 164 in peripheral device 102 can comprise a speaker, where processor 118 utilizes step 250 to simulate the conversation with the speaker, receptive circuit 160 and data 132. It is noted that in some embodiments, multiple instances of step 250 can be performed consecutively and/or concurrently. In an alternate scenario, if Lightning McQueen is determined to not be facing Mater after step 240, actuator 164 may comprise a motor and processor 118 may direct peripheral device 102 to physically turn and face Mater utilizing step 250 prior to simulating the conversation.

In one embodiment, processor 118 can utilize steps described in flowchart 200 to direct movement of peripheral device 102 across touch surface 116. For example, processor 118 can cause peripheral device 102 to move utilizing step 250 to control at leave one motor to steer wheels 140 and drive peripheral device 102 as a vehicle. Utilizing steps 220 through 240, processor 118 can track peripheral device 102 so that the movement can be directed based on any combination of the position, orientation, and identity of peripheral device 102. In some embodiments, processor 118 can direct movement of peripheral device 102 based on user input, such as touch-based input on touch surface 116, an external controller, such as a video game controller, and voice commands.

FIG. 1e, shows a dotted line, which corresponds to path 172 taken by peripheral device 102 as processor 118 directs movement of peripheral device 102 across touch surface 116. As shown in FIG. 1e, at position $P_2$, Lightning McQueen has collided with wall 170. In one embodiment, wall 170 is a digital element on touch screen display 116. In another embodiment, wall 170 can be another peripheral device, which may be placed by a user, for example, to create an obstacle course. Processor 118 can detect position $P_2$ and/or orientation $O_1$ of peripheral device 102 relative to wall 170 to determine that an in software event, e.g., the collision, has occurred. Furthermore, in step 250, processor 118 can generate data 132 based on position $P_2$ and/or orientation $O_1$ of peripheral device 102 relative to wall 170 (e.g. a peripheral device or digital element). For example, processor 118 may drive Lightning McQueen in reverse, turn wheels 140 to avoid wall 170, and drive Lightning McQueen forward on path 172. Other examples of processor 118 generating data 132 based on position $P_2$ and/or orientation of peripheral device 102 relative to a digital element of touch-sensitive system 100 result in haptic or tactile feedback, where actuator 164 of peripheral device 102 or actuator 120 of electronic device 106 vibrate when the digital element is gravel, as opposed to pavement, and where peripheral device 102 moves slower if the digital element is mud, as opposed to dirt. Also, as shown in FIG. 1e, digital headlight 174b can be generated based on any of position $P_2$ and orientation $O_1$ of peripheral deice 102 relative to wall 170 (e.g. a peripheral device or digital element) and is thus, depicted as being smaller as it is obscured by wall 170.

As processor 118 can determine orientation $O_1$ of peripheral device 102, processor 118 can determine a "point of impact" where only headlight 150b has collided with wall 150. Thus, in FIG. 1e headlight 150b shown as no longer being illuminated and digital headlight 174b is not shown at position $P_3$. Using step 250, data 132 can be stored in memory 162 of peripheral device 102, which can record that headlight 150b is damaged and no longer operable. Thus, for example, if peripheral device 102 is similarly utilized in a different touch-sensitive system, headlight 150b may still be inoperable until, for example, a user initiates a virtual repair of headlight 150b in software.

In one embodiment, path 172 is also on another touch surface in addition to touch surface 116. The touch surface may, for example, be part of another electronic device that is not shown. For example, a user may place two iPads side-by-side to expand touch surface 116.

In accordance with embodiments of the present invention, a digital mirror effect can be achieved on a display of touch-sensitive system 100. FIG. 1e shows virtual display 176, which is a digital image on touch screen display 116. Virtual display 176 shows virtual representation 178 of peripheral device 102 as Lightning McQueen. Utilizing an orientation and/or position of peripheral device 102 over touch surface 116, virtual display 176 can act as a digital mirror, where virtual representation 178 mirrors movement of peripheral device 102. For example, in FIG. 1e, processor 118 has determined that peripheral device 102 is in front of virtual display 176 at position $P_3$ and represents virtual representation 178 as having orientation $O_2$. If peripheral device 102 were to rotate, virtual representation 178 may also rotate. Also, FIG. 1e shows physical boundary 182, which may be represented in virtual display 176. In some embodiments, if peripheral device 102 were to move from position $P_3$, virtual representation 178 may move in virtual display 176 and may be only partially displayed as peripheral device 102 exits boundary 182.

In virtual display 176, virtual representation 178 of peripheral device 102 has decals 182a and 182b (also referred to as decals 182), which are virtual accessories of virtual representation 178. More particularly, peripheral device 102 does not physically include decals 182, which are included in virtual representation 178. Decals 182 can be, for example, unlocked in software by completing levels of a video game, performing an in software purchase, or can be linked to a user profile and/or an identity of peripheral device 102 as determined in step 230, for example. Examples of virtual accessories, for Lightning McQueen can include virtual makeup, an animated mouth, snow tires, dirt tires, rims, and hats.

Virtual accessories for physical objects, such as peripheral device 102, as opposed to virtual representation 178, track with the physical object and allow for an enhanced user experience. For example, digital headlights 174, described above, are virtual accessories, which provide enhanced realism. In one embodiment, virtual accessories are implemented as special tires or weapon upgrades, which can be unlocked in software, for example through a purchase using real or in-game currency. In one embodiment, the virtual accessories are adjacent peripheral device 102 on a display, such as touch screen display 116 of touch-sensitive system 100. In one embodiment, the virtual accessories can affect performance of a digital representation of peripheral device 102 in software. For example, if the virtual accessory comprise snow tires, the digital representation may have an attribute, such as a speed attribute over snow, which is increased due to having the snow tires. Processor 118 can also utilize the attribute to control peripheral device 118, e.g., by generating data 132 based on the attribute. For example, peripheral device 102 may move faster or slower depending on a magnitude of the speed attribute. The virtual accessory may similarly comprise off-road tires, causing better performance over gravel or dirt, and racing tires, causing better performance over asphalt.

In one embodiment, virtual accessories can be modified by user input. For example, the virtual accessory may be modified in response to a user pressing a button on touch surface 116, on a remote control, or on electronic device 106. As one example, the virtual accessory may be a cannon, which fires a projectile in response to the user input. As other examples, the virtual accessory can be a jet pack, a laser, or a tow hook.

Furthermore, in one embodiment, the virtual accessory enables the user input. For example, a button may appear on screen in response to peripheral device 102 having the virtual accessory. In one embodiment, the remote control is another electronic device, such as an iPad or an iPhone from Apple®. The another electronic device may send remote control data over a server, Bluetooth, or other means and may also be used as an additional display for software running on electronic device 106 instead of or in addition to serving as a remote control. For example, the another electronic device may display a different view of the same game word as electronic device 106, and/or in game status information.

It is noted that not all embodiments disclosed herein require processor 118 to be configured to communicate data 132 to a receptive circuit of peripheral device 102. Furthermore, not all embodiments disclosed herein require the communication to be in response to processor 118 identifying peripheral device 102 based on touches 111 on touch surface 116 of touch-sensitive system 100. However, in many preferred embodiments, processor 118 has such a configuration. In one embodiment, peripheral device 102 can drive itself across touch surface 116 with or without data 132, for example, utilizing a sensor, such as a camera, or utilizing user input from a remote control. In one embodiment, peripheral device 102 can drive itself across touch surface 116, physically moving in response to movement of a road (i.e. digital element) depicted on touch screen display 116. Similarly, headlights 150 and/or windshield 142 may be controlled by peripheral device 102 with or without data 132.

To further illustrate embodiments of the present invention, FIG. 1e shows peripheral devices 190a and 190b. Peripheral devices 190a and 190b can include similar components as peripheral device 102, shown in FIGS. 1b-1d, or may include different components or less components (such as only one or more touch points). Peripheral device 190a has a plurality of faces including faces 192a, 192b, 192c, and 192d. Each of faces 192a, 192b, 192c, and 192d has a different configuration of touch points, such as touch points 110, whereby peripheral device 190a has a different identity depending on which face of peripheral device 190a is identified by processor 118. For example, in the present embodiment, peripheral device 190a is a six-sided die and each face represents a different result of a user rolling the die. In the embodiment shown, the user has rolled a one, which can be determined by processor 118 by identifying peripheral device 190a based on one or more touch points on face 192d. As shown in FIG. 1e, peripheral device 190a has a visual marking or indicator (e.g., dot) on face 192a, which displays on peripheral device 190a information related to what is identified by processor 118. The visual marking may be permanently on peripheral device 190a and/or only appear on peripheral device 190a after processor 118 has identified peripheral device 190a.

Peripheral device 190b is similar to peripheral device 190a with faces 194a, 194b, 194c, and 194d having different configurations of touch points, such as touch points 110, whereby peripheral device 190b has a different identity depending on which face of peripheral device 190b is identified by processor 118. In one embodiment, processor 118 can distinguish peripheral device 190b from peripheral device 190a, whether it be from having different configurations of touch points (e.g., different identities for its faces than peripheral device 190a), an RFID tag, or other means, including those described above. Thus, for example, each user of electronic device 106 can have a unique die, such that processor 118 can determine which user has rolled the die. In one embodiment, each user must first register in software with a peripheral device 190a or 190b. In another embodiment the software automatically associates each of peripheral devices 190a and 190b with different users. Of course the above concepts are not limited to die. For example, peripheral devices 190a and 190b could be playing cards. As another example, peripheral devices 190a and 190b could be checkers pieces where one face identifies as a "kinged piece."

In various embodiments of the present invention, peripheral devices, such as peripheral devices 102, 104, 190a, and 190b may be placed in physical contact with touch surface 116. As such, there is a risk of scratching touch surface 116 and/or making noise if touch points, such as touch points 110, were to move on touch surface 116. In one embodiment, touch points 110 comprise soft capacitive material, such as a conductive elastomer or other polymer that does not scratch touch surface 116. Other examples include at least one of a conductive thread sewn on fabric, a conductive ink printed on, for example, paper or plastic, a conductive paint, a polished metallic material, metallic material with a coating, such as paint or flocking, and a conductive foam.

However, in some embodiments, touch points, such as touch points 110, may be prone to scratching touch surface 116 and/or making noise if the touch points were to move on touch surface 116. Thus, in some embodiments, touch surface 116 can be protected from direct physical contact with the touch points. For example, in one embodiment, a peripheral device or touch surface 116 includes a means for spacing the touch points from touch surface 116 to prevent the direct physical contact when the peripheral device is on touch surface 116. Referring to FIG. 1c, for example, wheels 140 may space touch points 110 from touch surface 116 when peripheral device 102 is on touch surface 116. However, touch points 110 are close enough to touch surface 116 to register touches 111. In one embodiment, peripheral device 190a can include protective material such as scratch proof and/or scratch resistant material, for example rubberized material, on each of faces 192a, 192b, 192c, and 192d to space touch points from touch surface 116. In some embodiments, the protective material covers the touch points. Also, in some embodiments, the protective material exposes the touch points.

In some embodiments, the protective material and/or other material form the touch points. For example, the material can cover a portion or portions of one or more conductive layers to expose one or more portions of the conductive layer to electrical contact with touch surface 116 while shielding other portions of the conductive layer from electrical contact with touch surface 116, whereby the exposed portions form the touch points. In this way, different coverings can be applied to peripheral devices to change or set their identify as determined by processor 118.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of using a first peripheral device of a plurality of peripheral devices by a touch-sensitive system having a processor and a touch surface, the first peripheral device having a light router with a mirror and one or more light emission locations on an outer surface of the first peripheral device, the method comprising:
   detecting, using the processor, a plurality of touches on the touch surface of the touch-sensitive system that are made by the first peripheral device;
   identifying, using the processor, the first peripheral device based on the plurality of touches on the touch surface of the touch-sensitive system that are made by the first peripheral device;
   determining a position of the first peripheral device on the touch surface, the position being a location on the touch surface where the first peripheral device touches the touch surface; and
   generating a light on the touch surface at the position of the first peripheral device on the touch surface for routing the light through the light router of the first peripheral device using the mirror of the light router to present the light at the one or more light emission locations on the outer surface of the first peripheral device.

2. The method of claim 1, wherein the plurality of touches are contemporaneous.

3. The method of claim 1, wherein the first peripheral device is a car having a windshield being the one or more light emission locations on the outer surface of the first peripheral device, and wherein the light router routs the light, using the mirror of the light router, to the windshield of the first peripheral device.

4. The method of claim 1, wherein the light is part of an image generated by the first peripheral device on the touch surface, and wherein the one or more light emission locations display the image.

5. The method of claim 1, wherein the first peripheral device is a car having a headlight being the one or more light emission locations on the outer surface of the first peripheral device, and wherein the light router routs the light, using the mirror of the light router, to the headlight of the first peripheral device.

6. The method of claim 1, wherein the mirror is part of a prism having a curved surface.

7. The method of claim 1, comprising communicating data to a receptive circuit of the first peripheral device based on the position of the first peripheral device on the touch surface.

8. The method of claim 7, wherein the communicating the data to the receptive circuit of the first peripheral device is performed utilizing a radio frequency (RF) transmission.

9. The method of claim 1, wherein each of the plurality of peripheral devices has a different identity, and wherein generating the light is based on the identity of the first peripheral device identified based on the plurality of touches on the touch surface of the touch-sensitive system that are made by the first peripheral device.

10. A touch-sensitive system for use with a first peripheral device of a plurality of peripheral devices, the first peripheral device having a light router with a mirror and one or more light emission locations on an outer surface of the first peripheral device, the touch-sensitive system comprising:
   a touch surface;
   a processor, the processor being configured to:
      detect a plurality of touches on the touch surface of the touch-sensitive system that are made by the first peripheral device;
      identify the first peripheral device based on the plurality of touches on the touch surface of the touch-sensitive system that are made by the first peripheral device;

determine a position of the first peripheral device on the touch surface, the position being a location on the touch surface where the first peripheral device touches the touch surface; and generate a light on the touch surface at the position of the first peripheral device on the touch surface for routing the light through the light router of the first peripheral device using the mirror of the light router to present the light at the one or more light emission locations on the outer surface of the first peripheral device.

11. The touch-sensitive system of claim 10, wherein the first peripheral device is a car having a windshield being the one or more light emission locations on the outer surface of the first peripheral device, and wherein the light router routs the light, using the mirror of the light router, to the windshield of the first peripheral device.

12. The touch-sensitive system of claim 10, wherein the light is part of an image generated by the first peripheral device on the touch surface, and wherein the one or more light emission locations display the image.

13. The touch-sensitive system of claim 10, wherein each of the plurality of peripheral devices has a different identity, and wherein generating the light is based on the identity of the first peripheral device identified based on the plurality of touches on the touch surface of the touch-sensitive system that are made by the first peripheral device.

14. A peripheral device for use with a touch-sensitive system having a touch surface, the peripheral device comprising:

a plurality of touch points configured to contact the touch surface of the touch-sensitive system;

the plurality of touch points further configured to provide touches to the touch-sensitive system for identifying the peripheral device;

one or more light emission locations on an outer surface of the first peripheral device; and a light router having a mirror, the light router configured to:
receive a light generated on the touch surface at the position of the peripheral device on the touch surface; and route the light, using the mirror of the light router, to the one or more light emission locations on the outer surface of the peripheral device.

15. The peripheral device of claim 14, wherein the peripheral device is a car having a windshield being the one or more light emission locations on the outer surface of the peripheral device, and wherein the light router routs the light, using the mirror of the light router, to the windshield of the peripheral device.

16. The peripheral device of claim 14, wherein the peripheral device is a car having a headlight being the one or more light emission locations on the outer surface of the peripheral device, and wherein the light router routs the light, using the mirror of the light router, to the headlight of the peripheral device.

17. The peripheral device of claim 14, wherein the mirror is part of a prism having a curved surface.

18. The peripheral device of claim 14, wherein the light is part of an image generated by the peripheral device on the touch surface, and wherein the one or more light emission locations display the image.

* * * * *